US007006084B1

(12) United States Patent
Buss et al.

(10) Patent No.: US 7,006,084 B1
(45) Date of Patent: Feb. 28, 2006

(54) METHOD AND SYSTEM FOR COMPUTER AIDED MANUFACTURING MEASUREMENT ANALYSIS

(75) Inventors: Siegfried Kurt Buss, Ditzingen (DE); Frank Farid Qualitsen, Kornwestheim (DE)

(73) Assignee: Faro Technologies, Inc., Lake Mary, FL (US)

( * ) Notice: Subject to any disclaimer, the term of this patent is extended or adjusted under 35 U.S.C. 154(b) by 577 days.

(21) Appl. No.: 09/670,192

(22) Filed: Sep. 26, 2000

(51) Int. Cl.
*G06T 15/00* (2006.01)
(52) U.S. Cl. .......................... 345/419; 700/56; 702/152
(58) Field of Classification Search ................ 345/419, 345/420; 716/19; 702/152; 700/161, 195, 700/258, 264, 56, 255
See application file for complete search history.

(56) References Cited

U.S. PATENT DOCUMENTS

| 4,676,002 A | | 6/1987 | Slocum |
| 4,794,513 A | | 12/1988 | Muller |
| 5,392,222 A | * | 2/1995 | Noble .......................... 716/19 |
| 5,402,582 A | | 4/1995 | Raab |
| 5,724,264 A | | 3/1998 | Rosenberg et al. |
| 5,754,842 A | | 5/1998 | Minagawa |
| 5,850,348 A | | 12/1998 | Berman |
| 5,907,850 A | | 5/1999 | Krause et al. |
| 5,978,748 A | | 11/1999 | Raab |
| 6,089,742 A | * | 7/2000 | Warmerdam et al. ......... 700/56 |
| 6,556,206 B1 | * | 4/2003 | Benson et al. ............... 345/473 |

FOREIGN PATENT DOCUMENTS

| WO | WO 97/40336 | 10/1997 |
| WO | WO 98/08050 | 2/1998 |
| WO | WO 00/06969 | 2/2000 |

OTHER PUBLICATIONS

Foley et al., Computer Graphics Principles and Practice: Second Edition in C, 1996, Addison-Wesley, Chapter 7.*
Wocke, P., "KMG Automatisch Programmieren Generierung, Visualisierung Und Modifizierung Von Antastpunkten Und Verfahrwegen", F & M. Feinwerktechnik Mikrotechnik Messtechnik, Hanser, Munchen, DE, vol. 102, No. 4, Apr. 1, 1994, pp. 181-186.
Preliminary International Search Report, FA 612519, FR 0112009, Jun. 10, 2005.

* cited by examiner

*Primary Examiner*—Phu K. Nguyen
(74) *Attorney, Agent, or Firm*—Cantor Colburn LLP

(57) ABSTRACT

The invention relates to a computer-based method and system to facilitate quality control for manufactured assemblies based on computer aided design (CAD) files. The instant invention mitigates the problems encountered with large CAD files by decomposing each of such files into a multi-file format. A large CAD file is thereby broken-down into smaller files that organize the information contained in the larger file. The organization is performed in such a way that the information pertinent to the measurement process is segregated into a different smaller file than the information not needed to calculate measurements. Thus, the computer running the computation accesses a smaller file containing a higher percentage of required information. Additionally, assisting the user in coordinating a match-up between the physical surfaces being measured and the proper associated CAD model version of that surface further increases the handling speed. In particular, the instant invention uses selection regions for each surface. A selection region consists of the representation of a three-dimensional rectangle region just large enough to enclose each individual surface. A selection region indexes each surface. Thus, when a measurement point is taken, a list of surface regions is automatically scanned in order to determine which region contains that point. The corresponding distance of that measurement point to the surface is then calculated.

10 Claims, 5 Drawing Sheets

METHOD AND SYSTEM FOR COMPUTER AIDED MANUFACTURING MEASUREMENT ANALYSIS

BACKGROUND

The invention relates to a method and system for computer aided manufacturing measurement (CAM2) analysis. In particular, the instant invention assists in managing large computer-aided design (CAD) files and to the reorganization of the data from those large CAD files into smaller more manageable and quickly accessible files. Further, the instant invention provides for improved CAD model surface selection when comparing manufactured assembly surfaces to the CAD model.

The manufacturing/industrial marketplace commonly uses computer-aided design (CAD) and computer-aided manufacturing (CAM). CAD software allowed engineers to produce 3-D images in the front end of the design process, which shortened the production cycle and led to tremendous gains in productivity. CAM software and equipment increased the efficiency and quality of machined parts. Despite these technological advances in design and manufacturing, something important was missing from the production cycle. That is, a highly accurate, efficient, and convenient measurement methodology for ensuring that the products and components met the original CAD specifications. Historically, measuring assemblies made of numerous parts against the CAD model has been unwieldy, expensive and unreliable.

Traditionally, the measurement and quality inspection function in the manufacturing process has been time-consuming and limited in size, scope, and effectiveness for a number of reasons. Manual measurement tools, such as calipers and scales may be slow, imprecise, and always one-dimensional. Analog test fixtures are costly and inflexible. Also, standard coordinate measurement machines, while providing a high degree of precision, are generally located in quality control labs or inspection facilities at a distance from the manufacturing floor. Parts must be removed one at a time and transported to the lab for components—which often translates into significant "down time" for the production line. In essence, traditional measurement techniques—also known as metrology—have lagged far behind in the technological advances of the production process.

The CAD/CAM and metrology markets, as well as a worldwide emphasis on quality in all aspects of the manufacturing process, are driving the need for a missing link, which is referred to as Computer-Aided Manufacturing Measurement (CAM2). In other words, CAM2 is a CAD-based total quality assurance technology. To date, adaptive measurement hardware and usable CAD-based measurement software have yet to be fully implemented in the manufacturing industry.

More recently, advances have been made in adaptive measurement hardware, as described in U.S. Pat. No. 5,402,582, the contents of which are incorporated herein by reference. Such hardware allows the measurement of points on an object and the comparison of the location of those points to CAD specifications. In order to speed the overall comparison process, the hardware should be connected to a local computer. Alternatively, as described in U.S. Pat. No. 5,978,748, the contents of which are also incorporated herein by reference, the hardware can be equipped with an on-board computer. Such systems allow precision measurement of assemblies at every step of the manufacturing process and at any location. Earlier systems required the assembly being measured to be taken to the confines of a quality control lab, which is time consuming and often impractical.

FIG. 1 is a diagrammatic view of a conventional three dimensional measuring system generally including a coordinate measuring system generally including a coordinate measuring machine (CCM) 10 composed of a manually operated multi-jointed arm 12 and a support base or post 14, a controller or serial box 16 and a host computer 18.

One significant drawback of the current state of technology referred to above is that CAD files demand powerful computers. Thus, the CAM2 market is limited by the power of the computers generally found and distributed in an affordable way to that market. It may be common for a company to have one or two powerful and expensive computers in its quality control lab, but unlikely for that same company to have numerous expensive computers distributed throughout a factory. Since the adaptive measurement hardware devices mentioned above typically are standalone stations assigned at different points in the manufacturing process, cost is a primary concern. Hence, the requirement to handle the CAD files becomes a limiting factor. Typical PC capabilities must be sufficient to handle large computer files, which are ordinarily handled by much more powerful workstations.

Many manufactured products today are highly curved in three-dimensions. Quality control inspections of such products requires the ability to measure points on the object's surface and compare them to the surfaces in the CAD file. CAD files are usually quite large since they contain information regarding these curves, and points, vectors, various layer settings and other features and information important to each particular CAD format and yet not always relevant to measurement.

Further, when comparing measurements on an assembly the user must select a surface on the CAD model from which to make that comparison. Very often, due to the complexity of the numerous surfaces contained in a CAD model, the basic act of selecting a surface can be difficult and time intensive. A single CAD model could contain hundreds or thousands of surfaces from which to choose. Even if the user narrows his or her search to a specific region of the model, those surfaces can sometimes be difficult to distinguish because they overlap, are small, or are grouped closely.

SUMMARY OF THE INVENTION

The above discussed and other drawbacks and deficiencies of the prior art are overcome or alleviated by the instant invention. This invention provides a computer-based method and system to facilitate quality control for manufactured assemblies. In particular, the instant method and system assists the measurement of such assemblies and their comparison to large CAD files.

An embodiment of the invention mitigates the problems encountered with large CAD files by decomposing each of such files into a multi-file format. A large CAD file is thereby broken-down into smaller files that organize the information contained in the larger file. The organization is performed in such a way that the information pertinent to the measurement process is segregated into a different smaller file than the information not needed to calculate measurements. Thus, the computer running the computation accesses a smaller file containing a higher percentage of required information.

Additionally, assisting the user in coordinating a match-up between the physical surfaces being measured and the proper associated CAD model version of that surface further increases the handling speed. In particular, one embodiment uses selection regions for each surface. A selection region indexes each surface. Thus, when a measurement point is taken, a list of surface regions is automatically scanned in order to determine which region contains that point. The corresponding distance of that measurement point to the surface is then calculated.

DETAILED DESCRIPTION

Figure 1:
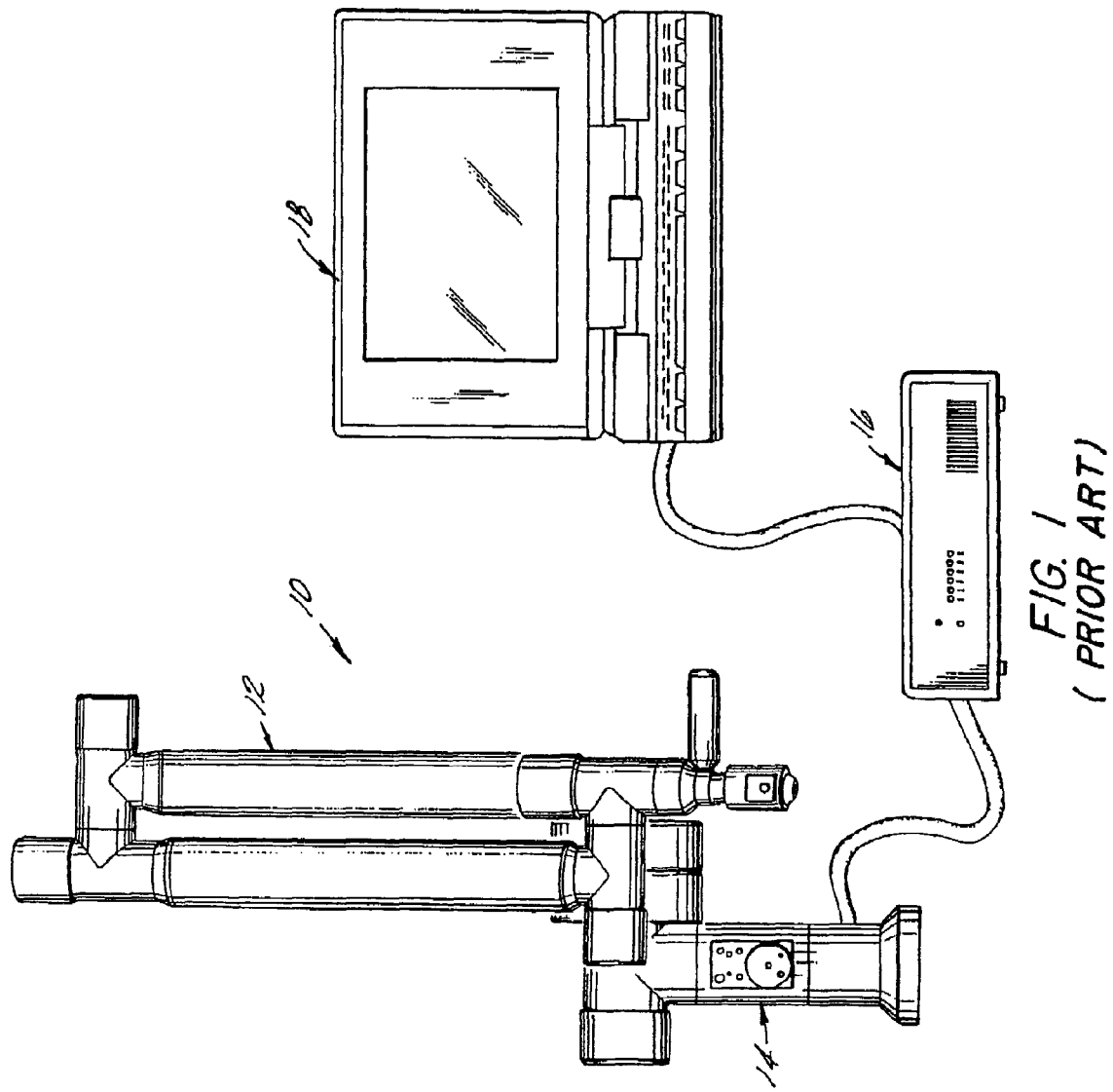
FIG. 1 is a diagrammatic view of a conventional coordinate measuring system.
Figure 2:
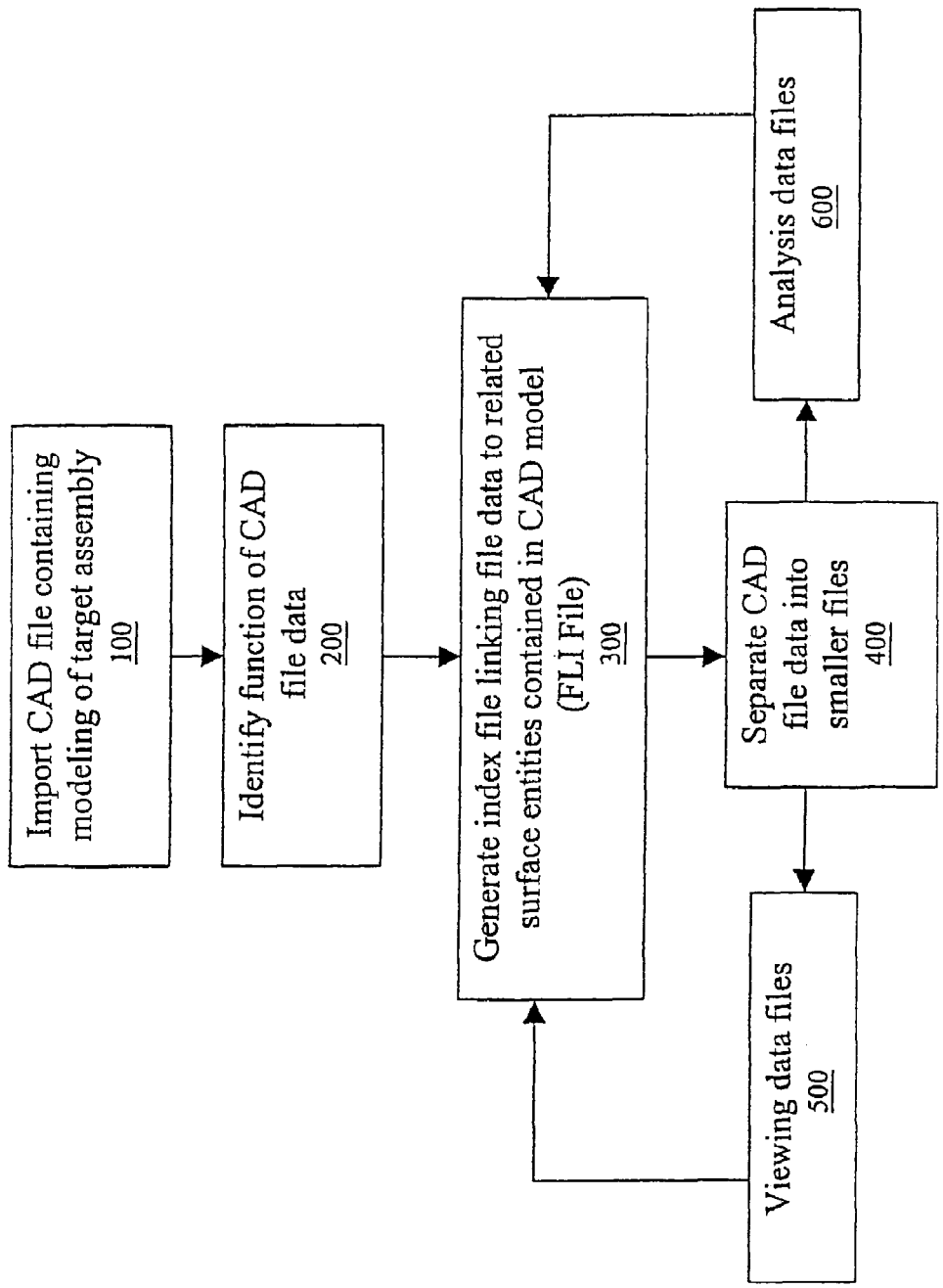
FIG. 2 is a diagram of the method and system of managing large CAD files using decomposition and reconfiguration techniques.

FIG. 2 is a diagram of the method of managing a large CAD file in one embodiment. The method may be a computer-implemented process in which a microprocessor executes steps in response to a computer program contained in a storage medium. In an exemplary embodiment, the host computer executes the process. Alternatively, a less sophisticated arm-based controller may execute the program as described in U.S. Pat. No. 5,978,748. As shown, a user initiates the process by importing a large CAD file containing a model of an identified assembly at 100. Standard CAD files contain a large number of layers that each includes large stores of information that, while important to the design phase of the model, are not entirely relevant to CAM2. The large CAD file is then analyzed, identifying the function of the data contained therein at 200. Also, each piece of data can be linked to surface entities contained in the CAD model. Thus, in order to not lose track of what data relates to each entity, an index file (FLI file) is generated that links each piece of file data to related surface entities in the CAD model at 300. In one embodiment, all the functions of CAD file data is broken-down into two groups. The first group relates to data used for viewing the CAD model through viewing data files 500 and the second group relates to data used for analysis of the CAD model through data analysis files 600. Thus, the CAD data is separated by these functional distinctions into smaller files at 400. It is important to note that even within these two main functional distinctions, further functional distinctions can be made. Also, although the original CAD file data has been decomposed and reconfigured, it always remains linked to its related surface entity in the CAD model by the FLI file.

Viewing Data includes information necessary to allow a user to view and select entities on the CAD model. The speed of the viewing system is achieved by not processing the core mathematics for the CAD surfaces when viewing. Normal CAD engines must process the math associated with the surfaces in order to display them. In contrast, the Analysis Data includes information necessary to enable the comparison of measurements from a physical assembly model with the CAD model. By not processing the imaging data when analyzing the geometric comparison, further speed enhancements are achieved.

Figure 3:
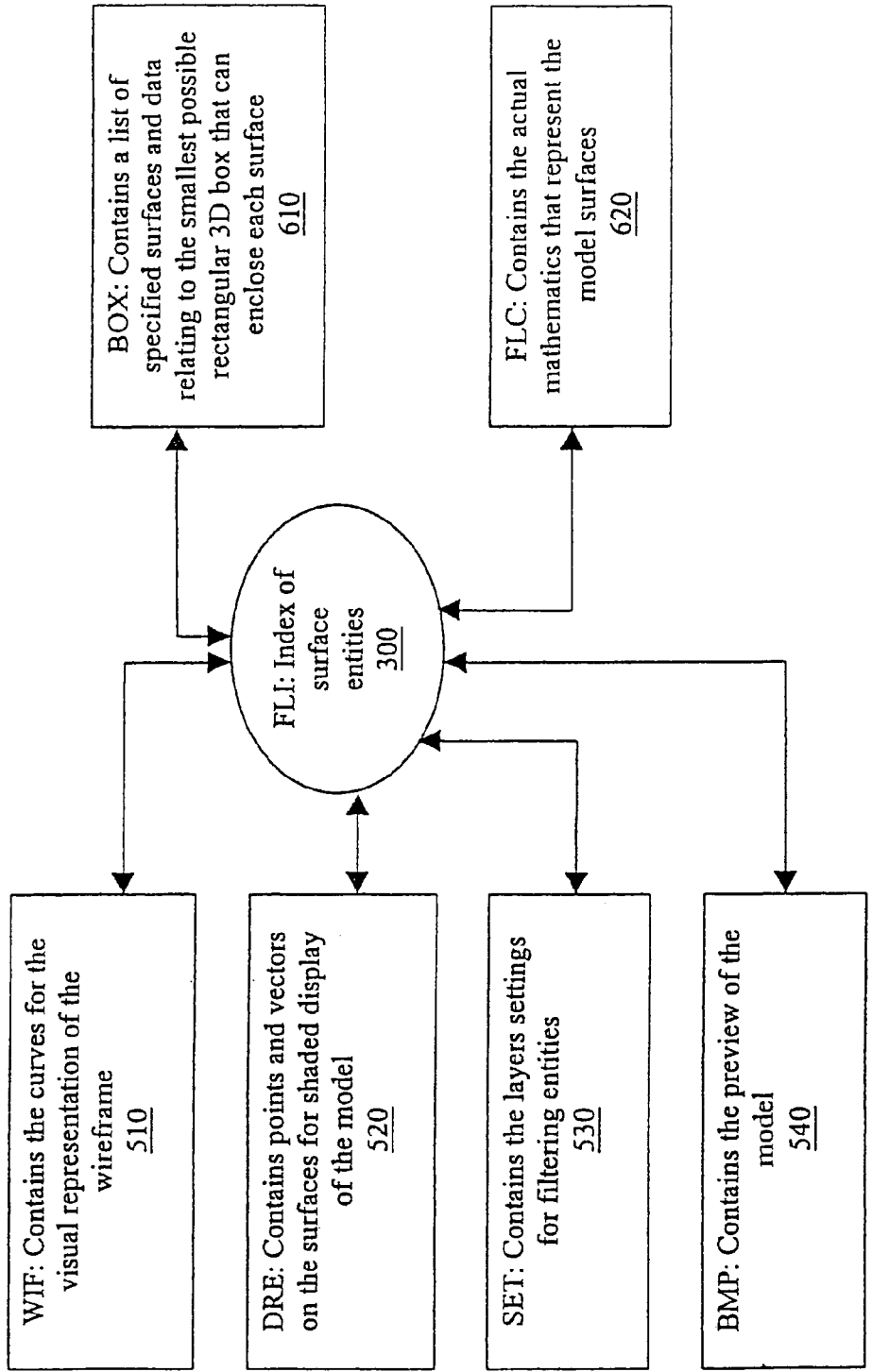
FIG. 3 is a diagram illustrating the relationship and decomposition of a CAD file into CAM2 format.

FIG. 3 is a diagram illustrating the decomposition of a CAD file into smaller files and their relationship to the linking index file (FLI file). As discussed above, the smaller files are arranged into two groups, the Viewing Data files 500 and the Analysis Data files 600. The Viewing Data files 500 are further broken down into four distinct files, the WIF 510, DRE 520, SET 530, and BMP 540 files. The WIF file 510 contains the curves for the visual representation of the wireframe model. The DRE file 520 contains the points and vectors on the surfaces for shaded display of the model. The SET file 530 contains the layers settings for filtering entities. The BMP file 540 contains the preview of the model. The Analysis Data files 600 are only broken-down into two smaller files, the REGION 610 and FLC 620 files. The REGION file 610 contains a list of specified surfaces and data relating to the smallest possible three-dimensional region that can enclose each surface. A selection region may be a three-dimensional rectangular box just large enough to enclose each individual surface. It is understood that other geometries may be used for the selection region. The FLC file 620 contains the actual mathematics that represent the model surface.

Figure 4:
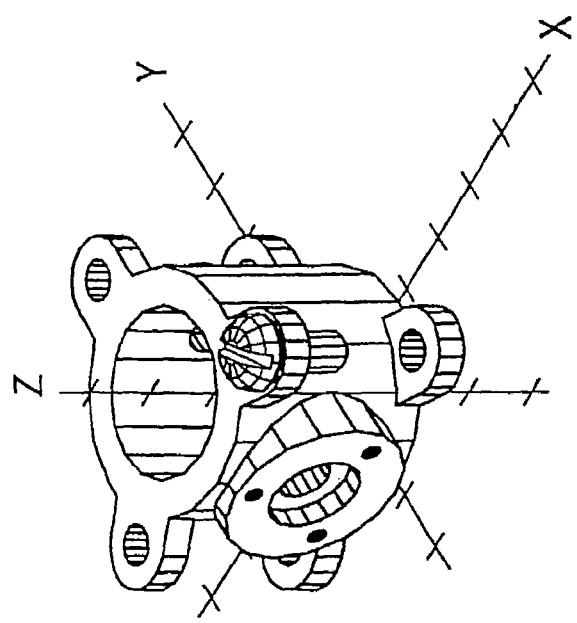
FIG. 4 is an illustration of a simple multi-surfaced CAD assembly drawing.

FIG. 4 is an illustration of a simple multi-surfaced CAD assembly drawing. Such an assembly is usually measured in a standard Cartesian coordinate system. Thus, any point on the assembly can be measured relative to any other point. As with generally used CAD files, a datum or reference point is generally defined, from which all other points are measured. In other words, the distance of a point on an assembly drawing is measured relative to that datum point.

Figure 5:
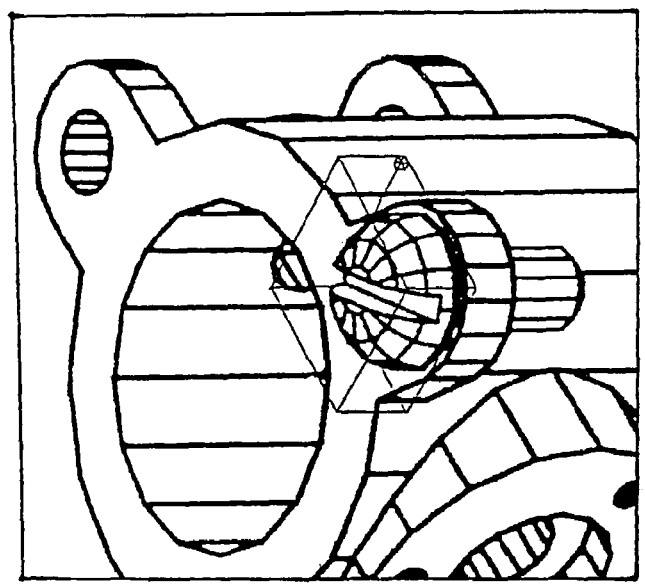
FIG. 5 is an illustration of a relief view of the CAD assembly seen in FIG. 4, showing the visualization of a surface selection region enclosing the top surface of a screw head.

FIG. 5 is an illustration of a relief view of the screw seen in the assembly of FIG. 4. Also, included in FIG. 5 is a visualization of a surface selection region enclosing the top of the screw head. Each surface of an assembly that can potentially be inspected after manufacture should be enclosed by its own surface selection region. Each region should enclose its corresponding surface with the smallest possible three-dimensional region. As seen in FIG. 5, the screw head outer surface is enclosed by a region. Thus, that region includes not only the numerous point that make-up the screw-head surface, but also many other points near the surface.

Figure 6:
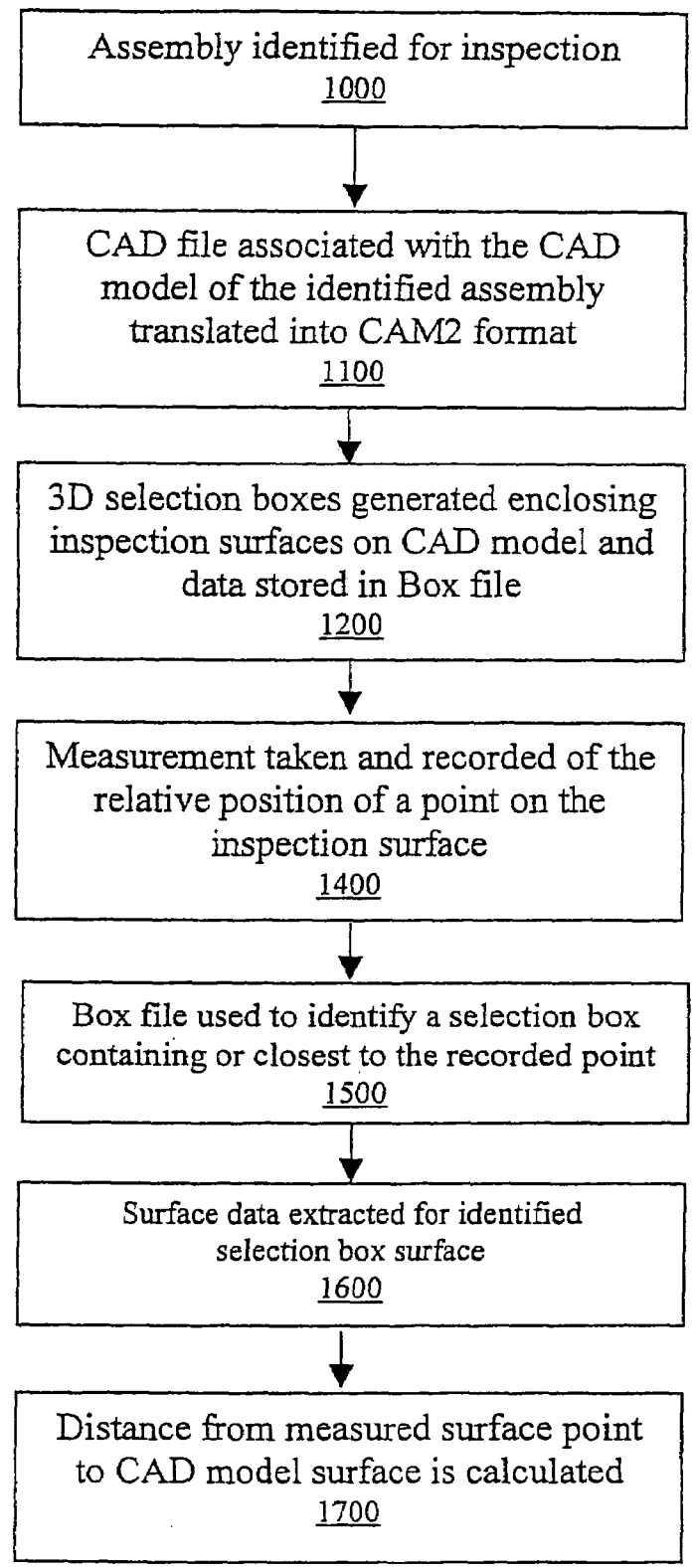
FIG. 6 is a diagram of the method and system of surface measurement comparison between an assembly and its CAD model in one embodiment.

FIG. 6 is a diagram of the method of surface measurement comparison between an assembly and its CAD model. The method may be computer-implemented as discussed above. In the initial step 1000, a physical object such as a manufactured assembly is identified for inspection. In order to relate to the instant system, that manufactured assembly is based on the parameters contained in an associated CAD file or files. In this way, measurement comparisons can be made between the physical model and the virtual one. Next the associated CAD file will be translated into the CAM2 format at 1100. As previously explained, the large CAD file is then decomposed and then saved into six smaller files. The next step involves generating three-dimensional selection regions enclosing each inspection surface at 1200. As described above, the data corresponding to each selection region, including what volume it defines, is saved in a Region file 610. That Region file 610 can then be used later to associate any point within that volume with a particular defined inspection surface. A measurement is then taken and recorded of the relative position of a point on the physical inspection surface at 1400. Thus, as with the model, a datum point is used, so that any measured points are measured relative to that datum point. The datum points for both the physical assembly and virtual model are the same. The physical assembly and virtual model may be aligned through an alignment algorithm performed based on measured datums. Any difference in the relative location of these datum points will change the quality or accuracy of the instant comparison. Thus the physically measured point, will have an analogous point on or near the virtual model. Due to differences in machining, the point analogous to the physically measured point may not lie on the surface of the virtual model. However, although the point does not lie on the surface it does probably lie near that surface and thus within a previously mentioned selection region. The computer thus uses the Region file 610 to identify a selection region containing or closest to the recorded point at 1500. The selection region is chosen automatically by the software. If a point lands inside multiple regions, the software will then consider both surfaces when looking for the closest surface. The purpose of the selection regions is so the software does not have to calculate distances to all the surfaces in the CAD model to determine the closest surface point. This is designed to limit the selection set. As described herein, the output to the user is simply distance to surface.

Once a Region file 610 is identified, surface data can then be extracted in order to analyze the relative position of the analogous surface point to that surface at 1600. Finally, a distance calculation is performed measuring the distance between the measured surface point and the CAD model surface at 1700. Thus should provide the user with information about how different the assembled model is relative to the originally designed model.

As described above, the present invention can be embodied in the form of computer-implemented processes and apparatuses for practicing those processes. The present invention can also be embodied in the form of computer program code containing instructions embodied in tangible media, such as floppy diskettes, CD-ROMS, hard drives, or any other computer-readable storage medium, wherein, when the computer becomes an apparatus for practicing the invention. The present invention can also be embodied in the form of computer code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A computer based method comprising:
    decomposing data from a computer aided design file of a model,
    saving said decomposed data in a plurality of smaller files wherein at least one of said smaller files is an analysis file which does not contain imaging data,
    accessing at least one of said analysis files to analyze the surface geometry of said model;
    wherein at least one of said smaller files comprises a list of specified surfaces on said model and data relating to the smallest possible three-dimensional region that can enclose each specified surface;
    obtaining the position of a surface point on an inspection surface of a physical object, at least one physical inspection surface on said physical object corresponding to an equivalent surface on said model, wherein each said surface on said model is enclosed by a different defined volume,
    defining at least one target volume from said defined volume that encloses said surface point,
    determining the distance between the surface on said model enclosed by said at least one target volume and said point on said physical object.

2. The method of claim 1 wherein,
    each of said defined volumes comprises the smallest possible three-dimensional region that can enclose said inspection surface.

3. A computer based method comprising:
    inputting a computer aided design file containing a model of a physical object, at least one inspection surface on said physical object corresponding to an equivalent surface on said model, wherein each of said surfaces on said model is enclosed by a different defined volume,
    including a datum point common to both said model and said physical object,
    inputting the position of a surface point on an inspection surface of said physical object,
    defining at least one target volume from said defined volume that encloses said surface point,
    determining the distance between the surface on said model enclosed by said at least one target volume and said point on said physical object.

4. The method of claim 3, wherein,
    if no defined volume encloses said point then said target volume comprises that defined volume closest to said point.

5. A computer based method comprising:
    inputting a computer aided design file containing a model of a physical object, at least one inspection surface on said physical object corresponding to an equivalent surface on said model wherein each of said surfaces on said model is enclosed by a different defined volume,
    including a datum point common to both said model and said physical object,
    inputting the position of a surface point on an inspection surface of said physical object,
    defining at least one target volume is from said defined volume that encloses said surface point,
    determining the distance between the surface on said model enclosed by said at least one target volume and said point on said physical object, wherein,
    each of said at least one of said defined volumes comprise the smallest possible three-dimensional region that can enclose said inspection surface.

6. A medium including machine-readable computer program code for managing computer aided design data, the medium including instructions for causing a computer to implement a method comprising:
    decomposing data from a computer aided design file of a model,
    saving said decomposed data in a plurality of smaller files wherein at least one of said smaller files is an analysis file which does not contain imaging data, accessing at least one of said analysis files to analyze the surface geometry of said model, wherein at least one of said smaller files comprises a list of specified surfaces on said model and data relating to the smallest possible three-dimensional region that can enclose each specified surface;

obtaining the position of a surface point on an inspection surface of a physical object, at least one physical inspection surface on said physical object corresponding to an equivalent surface on said model, wherein each said surface on said model is enclosed by a different defined volume, defining at least one target volume from said defined volume that encloses said surface point, determining the distance between the surface on said model enclosed by said at least one target volume and said point on said physical object.

7. The medium of claim 6 wherein, each of said defined volumes comprises the smallest possible three-dimensional region that can enclose said inspection surface.

8. A medium including machine-readable computer program code for use in measuring a physical object, the medium including instructions for causing a computer to implement a method comprising:

inputting a computer aided design file containing a model of a physical object, at least one inspection surface on said physical object corresponding to an equivalent surface on said model, wherein each of said surfaces on said model is enclosed by a different defined volume, including a datum point common to both said model and said physical object, inputting the position of a surface point on an inspection surface of said physical object, defining at least one target volume from said defined volume that encloses said surface point, determining the distance between the surface on said model enclosed by said at least one target volume and said point on said physical object.

9. The medium of claim 8, wherein, if no defined volume encloses said point then said target volume comprises that defined volume closest to said point.

10. A medium including machine-readable computer program code for use in measuring a physical object, the medium including instructions for causing a computer to implement a method comprising:

inputting a computer aided design file containing a model of a physical object, at least one inspection surface on said physical object corresponding to an equivalent surface on said model, wherein each of said surfaces on said model is enclosed by a different defined volume, including a datum point common to both said model and said physical object, inputting the position of a surface point on an inspection surface of said physical object, defining at least one target volume is from said defined volume that encloses said surface point, determining the distance between the surface on said model enclosed by said at least one target volume and said point on said physical object, wherein, each of said at least one of said defined volumes comprise the smallest possible three-dimensional region that can enclose said inspection surface.

\* \* \* \* \*